March 1, 1949.  J. M. KEMPER  2,463,489
CABIN PRESSURE CONTROL SYSTEM
Filed Aug. 31, 1945  4 Sheets-Sheet 1

Fig. 1

INVENTOR.
JAMES M. KEMPER
BY
ATTORNEY

March 1, 1949. J. M. KEMPER 2,463,489
CABIN PRESSURE CONTROL SYSTEM
Filed Aug. 31, 1945 4 Sheets-Sheet 3

INVENTOR.
JAMES M. KEMPER
BY
ATTORNEY

Patented Mar. 1, 1949

2,463,489

UNITED STATES PATENT OFFICE 2,463,489

CABIN PRESSURE CONTROL SYSTEM

James M. Kemper, Hollywood, Calif., assignor to The Garrett Corporation, Airesearch Manufacturing Company division, Los Angeles, Calif., a corporation of California Application August 31, 1945, Serial No. 613,794

33 Claims. (Cl. 98—1.5)

This invention relates to apparatus for controlling the ventilation, under pressure, of the atmosphere within an aircraft cabin. The invention deals particularly with the problem of maintaining within the cabin atmosphere conditions which are comfortable to the occupants of the cabin during rapid ascent or descent of the aircraft. Rates of ascent and descent have previously been limited to a large extent by the tolerance of pilot and passengers to rates of pressure change. Modern airplanes are capable of more rapid altitude change than can comfortably be tolerated by the average person under controlled pressure change conditions. Furthermore, these rapid altitude changes will permit more economical operation of the aircraft.

With these considerations in mind, the general object of the invention is to provide aircraft cabin pressure control mechanism capable of bringing about a gradual change in cabin pressure at least partially independent of the change in altitude of the aircraft. A further object of the invention is to provide a regulator incorporating rate of change mechanism which is simple, light in weight, and yet extremely accurate and reliable in operation. To the general attainment of this object, the invention contemplates employment of electrically operated rate changing mechanism.

A further object of the invention is to provide a cabin pressure regulator embodying rate of change control mechanism which is provided with means for varying the rate at which the change of cabin pressure is controlled.

Another object is to provide a cabin pressure regulator embodying a relatively simple manually adjustable device for varying the rate at which change of cabin pressure is controlled. More specifically, the invention contemplates a pressure regulating system wherein the pilot may quickly preset the rate at which the pressure change will be controlled.

The invention also deals with the problem of equalizing cabin pressure with atmospheric pressure at the airport where the craft is to land. The most desirable method of bringing the cabin pressure to the value of atmospheric pressure at the landing field is to effect a gradual change from the pressure at the airport where the plane takes off to the pressure at the landing field. For example, if a plane is to fly from an airport situated at approximately sea level to an airport situated at 5000 feet altitude, the comfort of the occupants of the plane would be best served by bringing about a gradual decrease in cabin pressure from the pressure at sea level to the pressure at 5000 feet, irrespective of the altitude the plane may have to attain in order to pass over mountains obstructing the path between the two airports. An important object of the invention is to provide a regulating system capable of bringing about a gradual change in cabin pressure from a value corresponding to atmospheric pressure at the take-off to a value corresponding to atmospheric pressure at the landing field, even though the plane may of necessity ascend to fairly high altitudes during the trip.

A major advantage of controlling cabin pressure in this manner is the elimination of the necessity for a gradual ascent or descent of the plane for the purpose of avoiding an uncomfortably rapid rate of pressure change within the cabin. Under many conditions it may be desirable for the plane to gain elevation rapidly in order to clear high mountains relatively close to the airfield, and a retarded rate of ascent may require "circling" in order to attain altitude, thus adding unnecessary miles to the trip. At the same time, however, if the plane attains a high altitude while the pressure within the cabin is maintained at a value departing only slightly from the starting value, a relatively high differential between cabin pressure and ambient pressure may be built up. One of the problems constantly faced by those dealing with cabin pressurization is the necessity for avoiding an unduly high differential in order that a cabin structure, in which weight and strength are properly correlated for other purposes, may adequately resist the stresses imposed by pressurization. The modern airplane is capable of flying at altitudes much higher than the altitudes normally required for clearing mountains in the path of regular airline flights. For example, whereas the altitude normally required for clearing mountains on schedule flights of airlines in the United States does not exceed 13,000 feet, there may be instances when it becomes necessary or desirable for a plane to ascend to 15,000 feet or 20,000 feet or even higher in order to avoid bad weather conditions at lower altitudes or in order to clear the higher mountains where conditions require a change of course or a flight over a higher mountain. It is possible to regard the higher altitude flight as being brought about by unusual conditions, as contrasted to the medium altitude flight of a plane in a scheduled route over mountains of medium altitude. It is not feasible to build a cabin structure sufficiently strong and heavy to withstand the differentials which would result from maintaining approximately sea level pressure within a cabin at the higher altitudes, but I find that it is feasible to operate on a differential sufficiently high to maintain approximately sea level pressure within a cabin at an altitude in the neighborhood of 13,000 feet.

The invention therefore contemplates the provision of a pressure controlled system capable of maintaining an uninterruptedly gradual change in cabin pressure from any starting altitude to any destination altitude down to sea level, during normal flight on major scheduled air routes, but which is also capable of deviation from the gradual change schedule in order to avoid exceeding a predetermined differential between cabin pressure and ambient atmospheric pressure where unusual conditions require ascent above the normal flying level.

In general, these objectives are accomplished by providing both rate of change mechanism for bringing about the gradual change in cabin pressure at a determined rate, together with differential control mechanism which is adapted to override the rate of change mechanism whenever the differential between cabin and ambient atmospheric pressures tends to exceed a determined limit.

One of the objects of the invention is to provide means for selecting and determining the altitude to which the change is to be made. For example, on one trip a plane may fly from a starting altitude of 200 feet to a destination altitude of 4500 feet, and on another occasion may start at an altitude of about 5000 feet and terminate at a flight altitude of 900 feet. In any case the invention contemplates "selecting" the destination altitude by setting the regulator so that at the end of the pressure changing operation, cabin pressure will correspond to ambient atmospheric pressure at that altitude, irrespective of what the starting altitude may have been. It is also an object of the invention to provide a rate of change control which will be capable of changing the cabin pressure at various rates and which is capable of being adjusted by the pilot to a selected rate such as to complete the change within the time required for the trip.

In some cases it may be desirable to have the pressure changing operation extend throughout the entire trip. In other cases it may be more desirable to bring the cabin pressure up to the selected destination value ahead of the arrival at the destination, and the invention provides for this mode of operation. In other cases, particularly where a plane must pass over very high mountains in its path, and where such mountains are at a sufficient distance from the starting point and the destination, it may be desirable to bring about a gradual change of pressure to a value corresponding to ambient atmospheric pressure at a higher altitude than the destination, hold the cabin pressure at this selected value until the mountains have been cleared and then reset the regulator for a gradual change from this selected value to a second selected value corresponding to ambient atmospheric pressure at destination. The invention also provides for this mode of operation.

One of the primary objects of the invention is to provide the combination of altitude selecting means, change rate control means, and overriding differential control means capable of functioning in the manner set forth above and which in addition is of relatively simple, inexpensive and light weight construction, and reliable in operation. To this end the invention contemplates employment of a relatively simple electrically driven device for automatically changing the adjustment of an absolute pressure responsive control device at a predetermined rate, whereby to change the response of such control element and thereby change the pressure which is maintained in the cabin under the control of such element. Variations from the rate of change is accomplished simply by providing for intermittent energization of the electric drive for the adjusting device and varying the ratio between the "on" and "off" periods of such intermittent operations. The selection of the value to which the pressure is to be changed is accomplished electrically by the balancing, in the circuit of a relay which controls the operation of a reversible electric motor (which drives the adjustment for the absolute pressure responsive control element) of a variable resistance changing with the change in setting of the adjustment device and a manually presettable variable resistance.

A further object of the invention is to provide a pressure regulating system involving mechanism for changing pressure at a controlled rate, in which the changing operation may be manually initiated, and is adapted to then operate automatically to completion thereof. Another object is to provide a regulating system involving such pressure changing mechanism, in which the direction of pressure change may be preselected by the manual means for initiating the operation.

A further object of the invention is to provide a pressure regulating system in which the ultimate rate of change and altitude selecting controls are electrical in character, and are embodied in light weight, simple, control mechanism.

While the invention provides a control mechanism of good dependability, it does not propose to entirely rely on the automatic control mechanism for achieving a change in the response of a pressure responsive control element. Accordingly, the invention has as a further object to provide both an automatic and a manual means for effecting an adjustment in the response of an isobaric bellows—or rather, pressure responsive control element—both of such adjusting means being available for use at all times.

Further objects and advantages of the invention will be brought out in the following part of the specification.

Referring to the drawings which are for illustrative purposes only.

Figure 1:
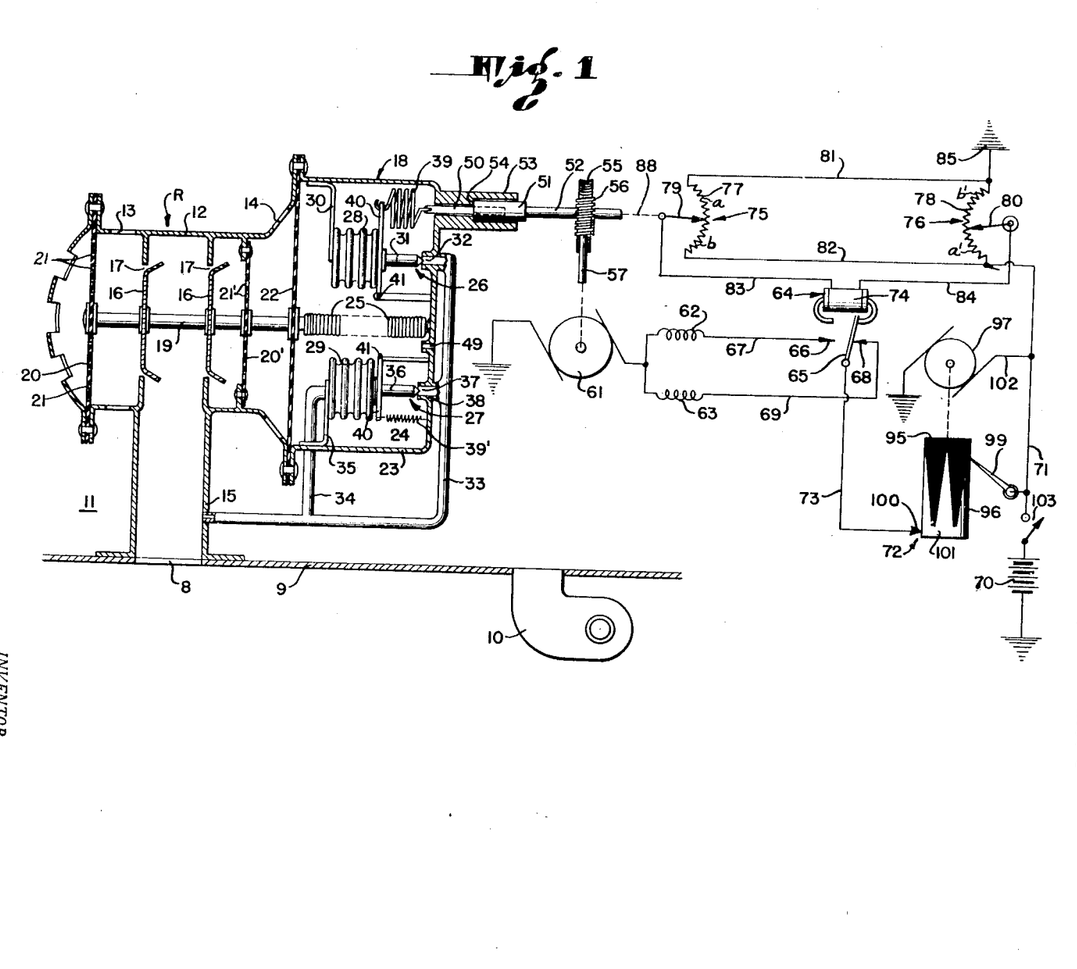
Fig. 1 is a schematic showing of a pressure regulating system embodying the invention.

As an example of a system embodying the invention, I have shown in Fig. 1 a schematic representation of a regulator adapted to control the outflow through an outlet 8 in the wall 9 of an aircraft cabin of air which is pumped into the cabin under pressure by suitable supercharging apparatus 10, or by a ram. The regulator is adapted to be disposed within the cabin atmosphere 11, and embodies generally a valve casing 12 into which cabin air flows through openings 13, 14. It has an outlet duct 15 for discharging such air to the cabin outlet 8, a pair of valve elements 16 controlling valve apertures 17 through which the air may flow from the valve casing 12, through the duct 15, through the outlet 8 in the cabin wall 9 to atmosphere, and a control mechanism which is indicated generally at 18.

The valves 16 are carried by a shaft 19 which is supported between a flexible support member 20 (comprising one or more spiraled webs separated by slots 21) and a diaphragm 22. The diaphragm 22 is clamped to one end of the casing 12 by a casing section 23 which cooperates therewith to define a control chamber 24 in which is maintained a pressure normally a trifle lower than the pressure in the cabin atmosphere. The diaphragm 22 responds to differentials arising between substantially cabin pressure which is exerted against its left side (as viewed in Fig. 1) and the pressure of the air in the control chamber 24, supplemented by the force of a spring 25, exerted against its right side. Any tendency of cabin pressure to drop below the level determined by the pressure in the control chamber 24 will result in movement of the diaphragm 22 in valve closing direction, thus causing the cabin pressure to rise to the proper level. Conversely, any excess of cabin pressure will result in valve opening movement, permitting cabin pressure to drop back to the level determined by the pressure in the control chamber 24.

The pressure in the control chamber 24 is determined and controlled by pilot valves 26 and 27 which are adapted to bleed excess pressure from the chamber 24 in accordance with the response of a pair of pressure responsive elements 28 and 29 to the pressures to which they are subjected.

The pressure responsive element 28 comprises a sealed bellows which is responsive to the absolute pressure existing in the chamber 24. One end of the bellows 28 is anchored to the casing 23 as indicated at 30 and the other end controls the movement of a metering pin 31 which is cooperable with an outlet 32 connected through a tube 33 to the duct 15 and thus in communication with ambient atmospheric pressure. The pressure responsive element 29 comprises a bellows which is exteriorly subject to the pressure in the chamber 24 and interiorly connected to the duct 15 and thus to ambient atmospheric pressure by a tube 34. Thus the pressure responsive element 29 is responsive to the differential between ambient atmospheric pressure and the pressure in the chamber 24. One end of the pressure responsive element 29 is connected to the casing 23 as indicated at 35, and the other end controls the movement of a metering pin 36 which is cooperable with an outlet 37 that communicates through a tube 38 with the duct 15 and thus with ambient atmospheric pressure.

The movable ends of the responsive pressure responsive elements 28 and 29 are subject to the pull of springs 39 and 39' exerted through a lever 40 attached to such movable end and pivoted to the casing as indicated at 41.

The metering pins 31 and 36 are each piloted in an opening 42 in a respective lever 40, and have abutting engagement with a knob 43 of the movable end of the respective pressure responsive elements 28 and 29. Each knob 43 is pivoted to a respective lever by a pivot pin 44 extending through the knob 43 and mounted in the side flanges of the lever 40, which is of channeled construction. The opening 42 is in the web of the channel. The abutting engagement between the metering pin and the knob 43 is maintained by the pressure of a light coil spring 45 against a washer 46 mounted on the metering pin, the other end of the spring 45 being engaged against a guide bushing 47 in which the valve end of the metering pin 31 is slidably piloted.

The pilot valves 26 and 27 control the outflow from the chamber 24 of air which bleeds into the chamber 24 through a restricted bleed aperture 49 in the wall of the casing 23. The pressure in the cabin 11 is maintained at a slightly higher level than that in the chamber 24 in order to induce this inflow through the aperture 49. The pressure within the chamber 24 is then varied by controlling the outflow through the pilot valves 26 and 27.

The absolute pressure responsive valve 26 normally controls the operation of the regulator. It is adapted to undergo a gradual change of setting (effected by shifting one end of the spring 39) and to bring about a corresponding change in the level at which the cabin pressure is maintained. The extent to which cabin pressure is changed depends upon the extent to which loading of the spring 39 is changed. The rate at which cabin pressure is changed is governed by the rate at which the loading of the spring 39 is changed. Since the aneroid 28 is unaffected by ambient atmospheric pressure, this change in cabin pressure will be independent of changes in ambient pressure, within the normal range of operation of the regulator. However, in order to protect the cabin structure against damage from an excessively high differential between cabin and ambient atmospheric pressure, the differential pressure responsive pilot valve 27 (which remains closed during the normal range of operation governed by the pilot valve 26) will override the pilot valve 26 and establish a limit upon the pressure differential, above which it will not permit the differential to increase.

The mechanism for shifting the anchored end of the spring 39 comprises a rod 50 into one end of which the spring is hooked, a nut 51 into which the rod 50 is threaded, and means including a shaft 52 for rotating the nut 51. The nut 51 is received within a socket 53 in the casing 23 and bears against a shoulder 54 under the pull of the spring 39. Mounted on the shaft 52 is a worm gear 55 which is driven by a worm 56. The worm 56 is mounted on a shaft 57 which carries a worm gear 58 meshing with a worm 59 on the shaft 60 of a reversible electric motor 61. The motor 61 is adapted to be selectively energized for driving the nut 51 in either direction so as to respectively increase or decrease the tension of the spring 39. The operation of the motor in one direction is effected by energizing a winding 62 and operation in the reverse direction is effected by energizing the winding 63 of the motor 61. The selective energizing of these windings is controlled by a polarized relay 64 comprising a double throw switch arm 65 adapted to engage a contact 66 to energize the winding 62 through a conductor 67, or to engage a contact 68 to energize the winding 63 through a conductor 69. Electric current is supplied to the switch arm 65 from a power source, indicated at 70, through a conductor 71, an intermittent interrupter 72, and a conductor 73.

The position of the switch arm 65, in accordance with conventional polarized relay operation, is determined by the direction of flow through the magnet coil 74 of the relay. Such direction of flow is in turn controlled by a Wheatstone bridge arrangement including a pair of potentiometers 75 and 76. The potentiometers comprise resistors 77 and 78 respectively and brushes 79 and 80 respectively, arcuately movable over the turns of the respective resistors. The resistors 77 and 78 are connected in parallel by conductors 81 and 82 respectively, and the brushes 79 and 80 are connected by conductors 83 and 84 respectively to the respective ends of the relay coil 74. The conductor 81 is grounded as at 85 and the conductor 82 is connected to the power line 71. The flow of current in the conductors 83 and 84 and through the relay coil 74 depends upon the relation existing between the various resistances of the Wheatstone bridge (e. g., the resistance of the segment $a$ of the resistor 77, multiplied by the resistance of the segment $a'$ of the resistor 78) and the resistance of the segment $b$ of the resistor 77 multiplied by the resistance of the segment $b'$. When the resistance $a$ times the resistance $a'$ is less than the resistance $b$ times the resistance $b'$, current will flow from the power line 71 through the segment $a'$, brush 80, conductor 84, coil 74, conductor 83, segment $a$ and conductor 81 to ground at 85, thus energizing the relay in one direction of polarity, and causing the arm 65 to engage one of the contacts 66, 68. When the resistance of $a$ times $a'$ is greater than that of $b$ times $b'$, current will flow from the power line 71 to the conductor 82, segment $b$, brush 79, conductor 83, coil 74, conductor 84, brush 80, and segment $b'$ to ground at 85, thus energizing the coil 74 in its opposite polarity, and causing the brush 65 to engage the other contact 66, 68.

When the resistance $a$ times $a'$ is the same as resistance $b$ times $b'$, brushes 79 and 80 are at the same potential and consequently no current will flow in the cross circuit including conductors 83 and 84 and the coil 74, the relay will be deenergized, and the switch arm 65 will assume a neutral position out of engagement with both contacts 66, 68. Under this condition, the motor 61 will be deenergized.

Cabin altitude selection is the selection of a desired maximum cabin pressure to be attained in the operation of the pressure changing mechanism. This is effected by adjusting the potentiometer 76 to a selected position determined by readings on the dial 86 of a cabin altitude selector 86a (see Fig. 3). For each position of the brush 80 thus selected there will be a corresponding position of the brush 79 of the potentiometer 75 in which the Wheatstone bridge will be balanced so as to deenergize the relay 64 and terminate the operation of the motor 61. The brush 79 arrives at such corresponding position of adjustment as the result of a driving connection to the brush 79 from the shaft 52. This driving connection is indicated schematically at 88 in Fig. 1 and comprises a pinion 88a on the shaft 52 and a gear 88b to which the brush 79 is connected (see Fig. 2). The position of the brush 79 is thus related to cabin pressure as determined by the adjustment of the spring 39 by rotation of the nut 51, and consequently after the required number of revolutions of the nut 51 for adjusting cabin pressure to the selected altitude, the brush 79 will arrive at a position wherein the Wheatstone bridge is balanced, the relay 64 is deenergized, and the operation of the motor 61 is terminated, thereby fixing cabin pressure at the level determined by the presetting of the cabin altitude selector 86a.

The cabin altitude selector (potentiometer) 76 forms a part of a selector unit S which also includes a rate of change selector (the intermittent circuit interrupter 72). The selector unit S is located at the control panel of the airplane and is therefore separate from the regulator unit of Fig. 2 (which will be hereinafter referred to generally by the reference letter R). The selector unit S is connected to the regulator unit R by a multiple conductor cable 93 which goes in through the casing 94 of the potentiometer 75 (a part of the unit R).

The rate of change control is effected through the intermittent interrupter 72, which comprises a drum 95 of insulating material (see Figs. 4 and 5) which carries one or more contact segments 96 of constantly varying breadth from end to end, a motor 97 for driving the drum 95 through reduction gearing 98, a brush 99 alternately engaging the insulating surface of the drum 95 and the contact surfaces of the segments 96 as the drum 95 revolves, and a brush 100 constantly engaging a ring 101 to which one end of each segment 96 is attached. The motor 97 is energized through a conductor 102 connected to the power line 71 in any suitable manner and will continue to rotate as long as current is flowing in the line 71. A main switch 103 may be employed for disconnecting the power line 71 from the source 70.

Figure 4:
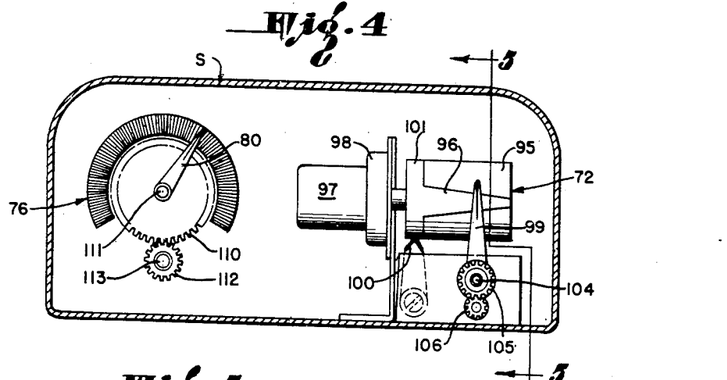
Fig. 4 is a detail sectional view of the selector unit.
Figure 5:
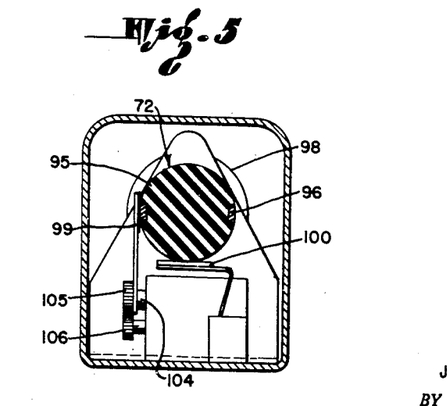
Fig. 5 is a sectional view taken on the line 5—5 of Fig. 4.

As long as the relay 64 is energized, current will intermittently flow in one of the circuits of the motor 61 in periods of alternate energization and deenergization. The ratio between the duration of the periods of energization and the duration of the periods of deenergization is determined by setting of the brush 99 which is adjustable longitudinally of the drum 95. Such adjustment may be provided for by mounting the brush for arcuate swinging movement upon a pivot 104 gearing the brush through any suitable gearing such as the gear 105 and pinion 106 to a control knob 107, with the knob 107 connected to the shaft of the pinion 106, and the gear 105 attached to the pivot 104 or brush 99. The position of adjustment of the brush 99 is indicated, upon a dial 108 above the knob 107, by a pointer 109 mounted on the pivot 104.

In a similar manner the brush 80 of the potentiometer 76 may be geared in any suitable manner, as by a gear 110 on the shaft 111 of the brush 80, and a pinion 112 meshing with the gear 110 and mounted on a shaft 113 which extends through the case of the control unit S and carries a control knob 114. A pointer 115, mounted on the shaft 111, cooperates with the dial 86 to indicate the cabin altitude selection.

Figure 2:
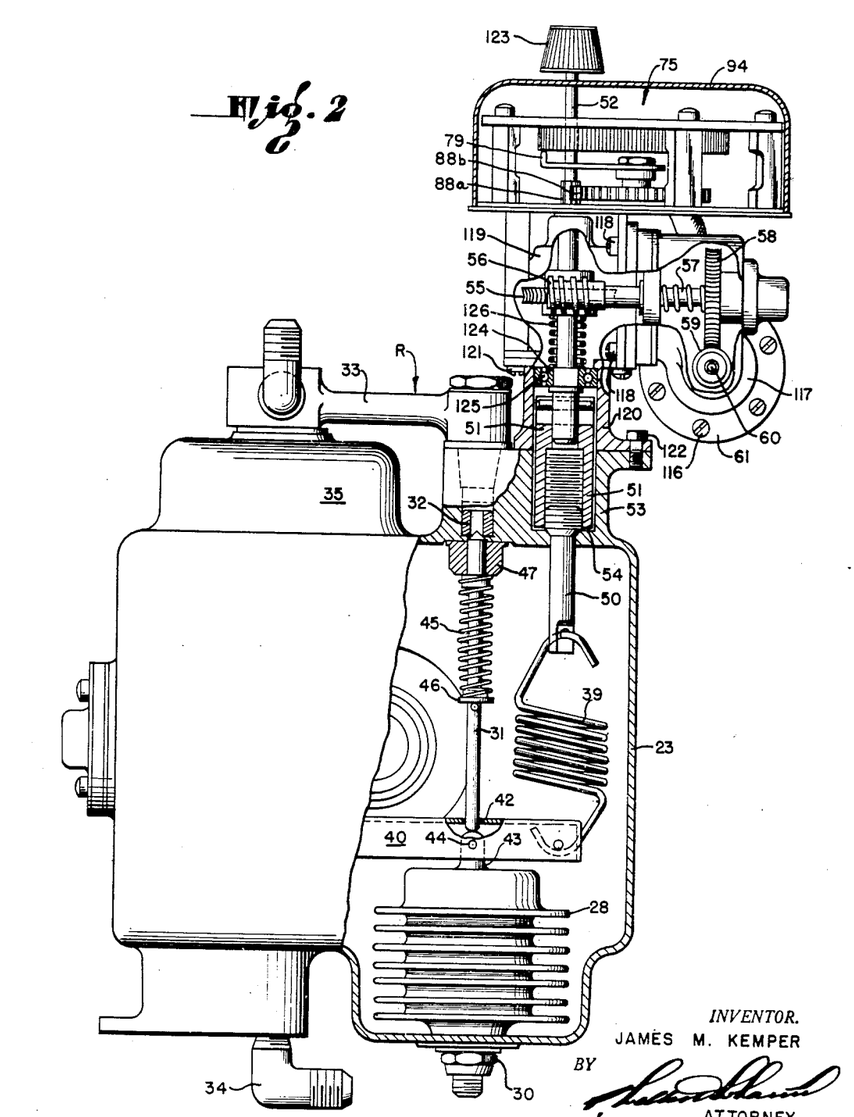
Fig. 2 is a side elevation, partially in section, showing the main units of the mechanism embodying the invention.
Figure 3:
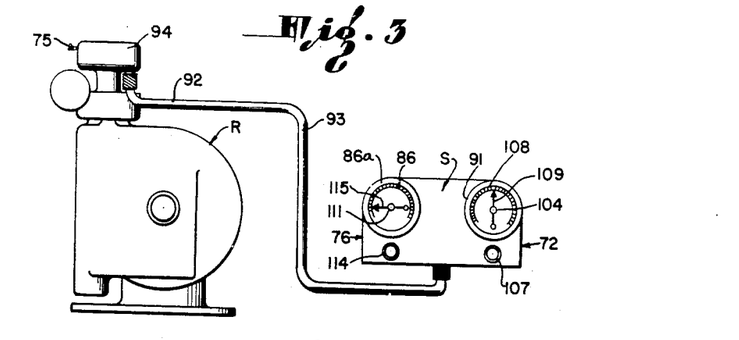
Fig. 3 is an assembly view of the system.

Referring now to details of construction of the regulator unit R, which has not been previously mentioned, it may be noted that the motor 61 is attached, by means of screws 116, to the gear case 117 of the primary gear set (worm 59 and gear 58), the case 117 being attached by screws 118 to the case 119 of the second gear set (worm 56 and gear 55). The case 119 is attached to the collar 120 by screws 121 and the collar 120 is attached to the control housing 23 by screws 122.

Means is provided for manually adjusting the spring 39 in the event of failure of automatic operation. Such means comprises a knob 123 on the end of the shaft 52 (which projects through the casing 94 of the potentiometer 75), a sliding bearing engagement of the shaft 52 in a bushing 124 (constituting the inner race of an antifriction bearing 125, by means of which the shaft 52 is journaled in the collar 120), and a spring 126 interposed between the bushing 124 and the worm gear 55. The spring 126 normally maintains the shaft 52 in a position in which the worm gear 55 meshes with the worm 56. By pushing the knob 123 inwardly against the yielding resistance of the spring 126, while the pinion 88a remains in mesh with the gear 88b, the gear 55 may be disengaged from the worm 56 so as to permit the manual rotation of the shaft 52. The pinion 88a is maintained in mesh with the gear 88b at all times in order that the timed relationship between the potentiometer 75 and the adjustment of the spring 39 may not be disturbed.

In the operation of my improved control system the diaphragm 22 functions as a differential pressure sensitive control element which responds to fluctuations in the differential between cabin pressure exerted against its one side and the pressure in the control chamber 24, exerted against its other side, to operate the valve 16 in a manner to maintain cabin pressure at a level determined by the pressure in the control chamber 24. Any increase in cabin pressure will act against the leftward side of the diaphragm 22 (as viewed in Fig. 1), moving it rightwardly against the force of the spring 25 and the force exerted by the pressure of the air cushion within the chamber 24. Such rightward movement will open the valve 16 permitting an increased outflow of air from the cabin and thereby allowing the pressure in the cabin to drop back to the selected level.

Any drop of cabin pressure below the selected level will relieve the pressure on the leftward side of the diaphragm 22, permitting it to yield leftwardly under the pressure of the air in the chamber 24 and the force of the spring 25, moving the valve 16 in closing direction, throttling the outflow of air from the cabin and permitting cabin pressure to build up to the selected level. The movement of the valve element is dampened by the dash pot effect of restricted inflow into the chamber 24 through the orifice 49 in response to such diaphragm movement. This is a factor which tends to avoid hunting.

The slight head of pressure which is maintained in cabin atmosphere 11 over the pressure in the control chamber 24 will cause a constant bleeding of cabin air into the chamber 24 through the restricted orifice 49, which, coupled with the slight outflow from the chamber 24 to ambient atmosphere through the pilot valve 26, will maintain the pressure in the chamber 24 at the level determined by the setting of the valve 26. It will now be apparent that the diaphragm 22 is the means for sensing changes in cabin pressure from a selected isobaric level and restoring cabin pressure to that level, and that the selected level is determined by the setting of the isobaric pilot valve 26, and that this setting in turn is controlled by the cabin pressure preselecting means and the rate of change means.

As previously stated, the pressure level in the cabin atmosphere is changed by changing the position of the adjustable end of the spring 39. This adjustment changes the spring load which is imposed upon the lever 40. This spring load, exerted in valve closing direction, is balanced against the loading of the evacuated bellows 28 by the pressure within the control chamber 24 exerted against the exterior of the bellows 28. As the tension of the spring 39 is increased, a corresponding increase in pressure in the chamber 24 is necessary in order to maintain the balance between the opposing forces. Consequently, the increase in tension in the spring 39 will cause a corresponding increase in pressure in the chamber 24 (since the pilot valve 26 can open to relieve the pressure in the chamber 24 only when the pressure against the bellows 28 overcomes the pull of the spring 39, and there is a constant tendency for the pressure in the chamber 24 to increase because of the fact that the supercharging apparatus tends to constantly build up the pressure in the cabin, and a head in the cabin pressure over the pressure in the chamber 24 is thus maintained owing to the restriction of the bleed orifice 49). When the pressure in the chamber 24 changes, as a result of adjustment of the spring 39, cabin pressure will change in step therewith.

Assuming now that a flight is to be made from the starting point located at substantially sea level to a destination located at an altitude of approximately 5000 feet, and that the valve 26 has previously been adjusted so as to establish a cabin pressure corresponding to ambient pressure at the starting point, the operator will, either at the commencement of the flight or at any proper time thereafter, change the setting of the cabin altitude selector 76 until the pointer 115 indicates a reading on the dial 86 corresponding to the maximum cabin altitude which is to be attained. Normally, such maximum cabin altitude will be the same as the destination altitude.

The operator will then adjust the rate of change selector 72 so as to give a rate of change that will bring the cabin pressure to the maximum limit within a desired period of time. The dial 108 may be calibrated in hours and minutes in order that this period of time may be indicated directly on the dial 108 by the pointer 109.

If high mountains are to be traversed shortly after the take-off, it may be necessary to select a faster rate of change than for a trip where high mountains are traversed at a later stage in the flight, in order that the plane may climb at a sufficiently rapid rate to traverse such mountains without the necessity of circling and yet avoiding such a rapid change in the ratio between cabin and ambient atmospheric pressures as to cause the differential between these pressures to exceed the maximum permissible differential. Where a rapid rate of change is not required, however, it will be preferable to select a rate of change which will cause the change to be made gradually throughout practically the entire trip, reaching the selected cabin altitude ceiling shortly prior to arrival at the destination. In either case, there will be a gradual decrease in pressure in the cabin (while ambient atmospheric pressure may fluctuate irregularly and at much more rapid rates), followed by the leveling off of cabin pressure at destination level, so that when the doors of the plane are opened, the pressure inside the cabin will be the same as external pressure. The entire operation will proceed automatically after the initial adjustment of the selector unit, and will require no further attention on the part of the operator.

The gradual decrease in cabin pressure is brought about by the gradual relaxing of the tension in the spring 39, permitting the pilot valve 26 to open at progressively lower pressures in the control chamber 24, thereby lowering the pressure in the chamber 24 through resultant escape of air therefrom through the tube 33, and correspondingly lowering the pressure in the cabin.

Figure 6:
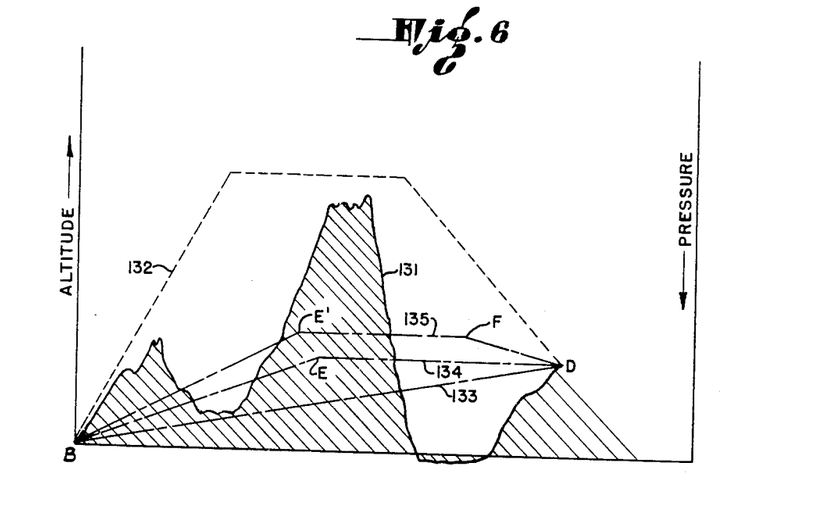
Fig. 6 is a flight diagram illustrating the normal operation of the invention.

The above described operation is illustrated in the chart shown in Fig. 6, wherein earth contour is indicated by the irregular line 131, the path of the plane flight is indicated by the broken line 132 and cabin pressure changes are indicated by the broken lines 133, 134, and 135. The starting point is indicated at B and the destination at D. The line 133 indicates a change in cabin pressure occupying the entire trip, so that the ceiling is not reached until the plane arrives at the destination. The line 134 indicates a more rapid rate of change, which brings cabin pressure to the selected ceiling at the point E, when the change in mechanism stops operating and the valve 26 thereafter maintains cabin pressure fixed at the selected ceiling. The line 135 indicates a change to a ceiling higher than ambient atmospheric pressure at the destination, such ceiling being arrived at a point E'. In order to bring cabin pressure to the destination level, the selector may be reset, at the point F. This latter type of operation may be used where the scheduled flight carries the plane through an altitude higher than that at which the differential between cabin and ambient atmospheric pressure may be maintained below the maximum permissible limit.

Figure 7:
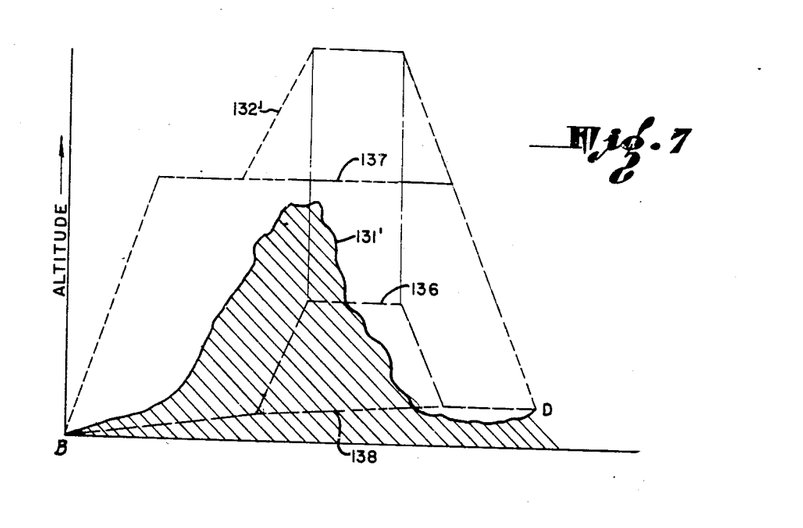
Fig. 7 is a flight diagram illustrating the operation of the mechanism under overriding differential control.

Fig. 7 illustrates the automatic overriding action of the differential control unit 27. The broken line 131' indicates topographical contour, the broken line 132' indicates the plane's flight, and the broken line 136 indicates the change in cabin pressure. Let it be assumed that the flight as originally planned was intended to proceed along the path indicated by the line 137, and that the selector unit were adjusted so as to bring about a gradual change in cabin pressure to destination level along the line 138. Let it be also assumed that as a result of a bad storm encountered while passing over mountains, the plane has been forced to deviate from the planned flight path 137, and to ascend to a much higher altitude, as indicated by the actual flight path 132', and that in so doing, the differential between the planned cabin pressure level as indicated by the line 138 and ambient atmospheric pressure along the higher level would exceed the maximum permissible differential. When this maximum differential is reached, the differential control valve 27 will come into operation, opening so as to prevent the differential between the pressure in the chamber 24 and ambient atmospheric pressure from exceeding the permissible maximum, and thus maintaining the differential between cabin and atmospheric pressure fixed at a corresponding maximum, until, in the descent of the plane, while maintaining the maximum differential, the pressure in the chamber 24 increases to the point where it becomes greater than the setting of isobaric control unit 26 which will then open. The valve 27 will then close and the valve 26 will resume control of the regulator. As the result of the overriding control of the valve 27, cabin pressure will vary in step with ambient atmospheric pressure as indicated by the parallel portions of the chart lines 132' and 136.

I claim as my invention:

1. Mechanism for controlling the pressure within an aircraft cabin, comprising: means directly controlling the pressure in the cabin; means defining a control chamber, one wall of which comprises a pressure responsive element connected to said direct control means for operating the same in response to changes in differential between the pressure in said chamber, acting against one side of said element and cabin pressure acting against the other side of said element, said chamber defining means having an aperture for bleeding of cabin air into said chamber; a pilot valve for controlling the escape of air from said control chamber to a region of lower pressure; means absolutely responsive to the pressure within said control chamber for operating said pilot valve; means for changing the response of the absolute pressure responsive means so as to change the pressure in said control chamber and thereby change cabin pressure; means for actuating said changing means; selectively variable means for controlling the operation of said actuating means at various selected rates; means for preselecting the cabin pressure to be attained; a control device connected to said changing means; and control means cooperatively controlled by said control device and said preselecting means for arresting the operation of said actuating means when cabin pressure has arrived at a preselected level.

2. Mechanism for controlling the pressure of an aircraft cabin, comprising: a valve directly controlling cabin pressure; walls forming a control pressure chamber having a connection with a source of pressure higher than that of said chamber and a connection with a zone of pressure lower than that in said chamber; a movable wall sensitive to variations in the differential between cabin pressure and control chamber pressure for controlling the operation of said valve; a device responsive to the pressure in said control chamber, for controlling one of said connections and thereby controlling the pressure in said chamber at a selected level; means for changing the response of said device; operating means for actuating said changing means at a predetermined rate; means for preselecting a cabin pressure ceiling; and presettable means for arresting the operation of said operating means when the cabin pressure arrives at a level corresponding to that set upon said preselecting means.

3. Mechanism for controlling the pressure of an aircraft cabin, comprising: a valve directly controlling cabin pressure; walls forming a control pressure chamber having a connection with a source of higher pressure and a connection with a zone of lower pressure; a movable wall sensitive to variations in the differential of pressure between cabin pressure and control chamber pressure for controlling the operation of said valve; an absolute pressure responsive device, responsive to pressure in said control chamber, for controlling one of said connections and thereby controlling the pressure in said chamber at a selected level; adjusting means for changing the response of the absolute pressure responsive device; operating means for actuating said adjusting means at a predetermined rate; variable control means for varying the rate at which said operating means operates; and presettable means for arresting the operation of said actuating means when cabin pressure arrives at a level set upon said presettable means.

4. Mechanism for controlling the pressure of an aircraft cabin, comprising: an outlet valve directly controlling cabin pressure; walls forming a control pressure chamber having a connection with the cabin and a connection with ambient atmosphere; a diaphragm sensitive to variations in the differential of pressure between cabin pressure and control chamber pressure for controlling the operation of said outlet valve; means, including a device having a movable member and absolutely responsive to pressure in said control chamber, for controlling one of said connections and thereby controlling the pressure in said chamber; a spring loading the pressure responsive device in one direction of movement of said movable member; adjusting means for changing the loading of said spring to correspondingly change the operation of said pressure responsive device so as to change said control pressure and thereby change cabin pressure; motor means for actuating said adjusting means; control means for changing the rate of operation of said motor means; and means for arresting the operation of said motor means after a predetermined number of cycles of operation thereof.

5. Mechanism for controlling the pressure of an aircraft cabin, comprising: a valve directly controlling cabin pressure; walls forming a control pressure chamber having a connection with the cabin and a connection with ambient atmosphere, one of said walls comprising a diaphragm connected to said valve and sensitive to variations in the differential of pressure between cabin pressure and control chamber pressure for controlling the operation of said valve; means, including a device absolutely responsive to pressure in said control chamber, for controlling one of said connections and thereby controlling the pressure in said chamber; a spring loading said device in one direction of movement thereof; an adjusting device for changing the loading of said spring so as to change the response of said responsive device in a manner to change said control pressure and thereby change cabin pressure; motor means for actuating said adjusting device; a variable control for changing the rate of operation of said motor means; means for preselecting a cabin pressure to be arrived at; means responsive to the number of cycles of operation of said motor means; and control means responsive to the cooperative action of said last named means and said preselected means to arrest the operation of said motor when a preselected cabin pressure has been reached.

6. Mechanism for controlling the pressure of an aircraft cabin, comprising: an outlet valve directly controlling cabin pressure; walls forming a control pressure chamber having a connection with a source of higher pressure and a connection with a zone of lower pressure; a movable wall, sensitive to variations in the differential of pressure between cabin pressure and control chamber pressure for controlling the operation of said outlet valve; means, including a device absolutely responsive to pressure in said control chamber, for controlling one of said connections and thereby controlling the pressure in said chamber; adjusting means for changing the response of said pressure responsive device so as to change said control pressure and thereby change cabin pressure; a motor for actuating said adjusting means; an interrupter device for intermittently energizing and deenergizing said motor and including means for adjusting the ratio between the on and off periods of intermittent operation; and means for arresting the operation of said motor when cabin pressure has reached a predetermined value.

7. Mechanism for controlling the pressure of an aircraft cabin, comprising: a valve directly controlling cabin pressure; walls forming a control pressure chamber having a connection with a source of higher pressure and a connection with a zone of lower pressure; a diaphragm sensitive to variations in the differential of pressure between cabin pressure and control chamber pressure and connected to said valve for controlling the operation thereof; a device absolutely responsive to pressure in said control chamber; a valve actuated by the pressure responsive device for controlling one of said connections and thereby controlling the pressure in said chamber; adjusting means for changing the response of said absolute pressure responsive device so as to change said control pressure and thereby change cabin pressure; an electric motor for actuating said adjusting means; an interrupter device for intermittently energizing and deenergizing said motor, and including means for adjusting the ratio between the on and off periods of intermittent operation; a potentiometer for preselecting the cabin pressure to be attained; a potentiometer connected to said electric motor; and a Wheatstone bridge including said two potentiometers and a relay bridging said potentiometers for arresting the energization of said motor when cabin pressure has reached the level preselected upon said first mentioned potentiometer.

8. Mechanism for controlling the pressure of an aircraft cabin, comprising: a valve directly controlling cabin pressure; walls forming a control pressure chamber having a connection with a source of higher pressure and a connection with a source of lower pressure, one of said walls being movable and being sensitive to variations in the differential of pressure between cabin pressure and control chamber pressure for controlling the operation of said valve; a device having a part absolutely responsive to pressure in said control chamber, for controlling one of said connections and thereby controlling the pressure in said chamber; means for changing the response of said device so as to change said control chamber pressure and thereby change the pressure in said enclosure; a motor for driving said changing means; control means for varying the rate of operation of said changing means by said motor; and means for arresting the operation of said motor when the pressure in said enclosure has reached a predetermined limit.

9. Mechanism for controlling the pressure of an aircraft cabin, comprising: an outlet valve directly controlling cabin pressure; wall means forming a control pressure chamber having a connection with a source of higher pressure and a connection with a zone of lower pressure; a diaphragm sensitive to variations in the differential of pressure between cabin pressure and control chamber pressure for controlling the operation of said outlet valve; a bellows device absolutely responsive to pressure in said control chamber, for controlling one of said connections and thereby controlling the pressure in said chamber; means for changing the response of said bellows device so as to change said control pressure and thereby change the pressure within the enclosure; an electric motor for driving said changing means; a potentiometer connected to said motor; a potentiometer for preselecting the pressure to be attained in said enclosure; and a polarized relay combined with said potentiometers to form a Wheatstone bridge adapted to be balanced when the enclosure pressure attains the preselected value whereby to deenergize said relay, said relay in turn serving to deenergize said electric motor and arrest the changing operation.

10. Mechanism for controlling the pressure of an aircraft cabin, comprising: means directly controlling cabin pressure; means forming a control pressure chamber having a connection with the cabin and a connection with ambient atmosphere; means sensitive to variations in the differential of pressure between cabin pressure and control chamber pressure for controlling the operation of said direct controlling means; means, including means absolutely responsive to pressure in said control chamber, for controlling one of said connections and thereby controlling the pressure in said chamber; means for changing the response of said responsive means so as to change said control pressure and thereby change the pressure within the enclosure; a reversible electric motor for operating said changing means; a polarized relay for controlling the energization of said motor in both directions of operation thereof; a potentiometer for preselecting an enclosure pressure to be attained; a potentiometer geared to said motor; connections between said potentiometers and said polarized relay providing a Wheatstone bridge of which said relay is in the bridging circuit, whereby the motor will be energized in a direction depending upon the direction of unbalance of said Wheatstone bridge and will be deenergized when the bridge is balanced; and means for intermittently arresting the flow of current to said motor, said last means including means for varying the ratio between the intervals of energization and deenergization of the motor so as to vary the rate of change.

11. Mechanism for controlling the pressure of an aircraft cabin, comprising: a valve directly controlling cabin pressure; walls forming a control pressure chamber having a connection with a source of higher pressure and a connection with a zone of lower pressure, one of said walls comprising a flexible diaphragm connected to said valve and sensitive to variations in the differential of pressure between cabin pressure and control chamber pressure for controlling the operation of said valve; an absolute pressure responsive device, absolutely responsive to pressure in said control chamber, for controlling one of said connections and thereby controlling the pressure in said chamber; adjusting means for changing the response of said responsive device so as to change said control pressure and thereby change the pressure within the enclosure; an electric motor controlling said adjusting means; means for energizing said motor; and means for intermittently arresting the operation of said motor, said last means including means for adjusting the ratio between the intervals of energization and deenergization of said motor so as to vary the rate of operation of said changing means.

12. Control mechanism as defined in claim 11, wherein said arresting means comprises a cylinder provided with circumferentially alternating longitudinally extending contacts and insulating areas of gradually varying circumferential width from one end to the other thereof; and a brush adapted to contact said areas, said brush being shiftable longitudinally of said cylinder.

13. Mechanism for controlling the pressure of an aircraft cabin, comprising: a valve directly controlling cabin pressure; means forming a control pressure chamber having a connection with a source of higher pressure and a connection with a zone of lower pressure; a movable wall connected to said valve and sensitive to variations in the differential of pressure between cabin pressure and control chamber pressure for controlling the operation of said valve; a device absolutely responsive to pressure in said control chamber, for controlling one of said connections and thereby controlling the pressure in said chamber; adjusting means for changing the response of said device so as to change said control pressure and thereby change cabin pressure; means for preselecting a desired cabin pressure; and means for automatically terminating the operation of said changing means when said desired pressure is attained.

14. Mechanism for controlling the pressure of an aircraft cabin, comprising: a valve directly controlling cabin pressure; wall means forming a control pressure chamber having a connection with a source of higher pressure and a connection with a zone of lower pressure; a diaphragm sensitive to variations in the differential of pressure between cabin pressure and control chamber pressure for controlling the operation of said valve; an aneroid absolutely responsive to pressure in said control chamber, for controlling one of said connections and thereby controlling the pressure in said chamber; adjusting means for changing the response of said aneroid so as to change said control pressure and thereby change cabin pressure; means for manually preselecting a cabin pressure to be arrived at; means for automatically terminating the operation of the changing means when said ceiling is attained; and means for preselecting the rate of operation of said changing means, whereby to predetermine the entire time period for making the complete change.

15. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure, adapted to control the pressure in said control chamber; changing means for changing the response of said pressure control means; operating means for actuating said changing means at a predetermined rate; means for preselecting an enclosure pressure to be arrived at; and presettable means for arresting the operation of said operating means when the enclosure pressure arrives at a level corresponding to that set on said preselecting means.

16. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure; pressure control means for said control chamber including pressure responsive means having one side subjected to the pressure in said control chamber for controlling the pressure in said control chamber; adjusting means for changing the response of said pressure control means; operating means for actuating said adjusting means at a predetermined rate; variable control means for varying the rate at which said operating means operates; and presettable means for arresting the operation of said adjusting means when enclosure pressure arrives at a level set upon said presettable means.

17. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure adapted to control the pressure in said control chamber; a spring loading said pressure responsive means in one direction of movement; adjusting means for changing the loading of said spring to correspondingly change the operation of said pressure responsive means so as to change said control pressure and thereby change enclosure pressure; motor means for actuating said adjusting means; control means for changing the rate of operation of said motor means; and means for arresting the operation of said motor means after a predetermined adjustment of said adjusting means.

18. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure adapted to control the pressure in said control chamber; adjusting means for changing the response of said pressure control means so as to change said control pressure; a motor for actuating said adjusting means; an interrupter device for causing said motor to be intermittently energized and deenergized and including means for adjusting the ratio between the on and off periods of intermittent operation; and means for arresting the operation of said energizing means when a predetermined adjustment of said pressure control means has been made.

19. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure adapted to control the pressure in said control chamber; adjusting means for changing the response of said pressure control means so as to change said control chamber pressure; an electric motor for actuating said adjusting means; a potentiometer for preselecting the cabin pressure to be attained; a potentiometer connected to said electric motor; and a Wheatstone bridge including said two potentiometers and a relay bridging said potentiometers for arresting the energization of said motor when cabin pressure has reached the level preselected upon said first mentioned potentiometer.

20. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure adapted to control the pressure in said control chamber; means for adjusting the response of said pressure control means so as to change said control chamber pressure and thereby change the pressure in said enclosure; a motor for driving said adjusting means; control means for varying the rate of operation of said adjusting means by said motor; and means for arresting the operation of said motor when said pressure control means has reached a predetermined adjustment.

21. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure adapted to control the pressure in said control chamber; means for changing the response of said pressure control means so as to change said control chamber pressure; an electric motor for driving said changing means; a potentiometer connected to said motor; a second potentiometer for preselecting the adjustment to be made to said pressure control means; and a polarized relay combined with said potentiometers to form a wheatstone bridge adapted to be balanced when said pressure control means reaches the preselected adjustment whereby to deenergize said relay, said relay in turn serving to deenergize said electric motor and arrest the changing operation.

22. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure adapted to control the pressure in said control chamber; means for changing the response of said pressure control means so as to change said control chamber pressure; a reversible electric motor for operating said changing means; a polarized relay for controlling the energization of said motor in both directions of operation thereof; a potentiometer for preselecting the adjustment to be made to said pressure control means; a second potentiometer connected to said motor; and connections between said potentiometers and said polarized relay providing a Wheatstone bridge of which said relay is in the bridging circuit, whereby the motor will be energized in a direction depending upon the direction of unbalance of said Wheatstone bridge and will be deenergized when the bridge is balanced.

23. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure adapted to control the pressure in said control chamber; adjusting means for changing the response of said pressure control means so as to change said control pressure; an electric motor controlling said adjusting means; means for energizing said motor; and means for intermittently arresting the operation of said motor, said last means including means for adjusting the ratio between the intervals of energization and deenergization of said motor so as to vary the rate of operation of said changing means.

24. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure adapted to control the pressure in said control chamber; adjusting means for adjusting the response of said pressure control means so as to change said control pressure and thereby change cabin pressure; means for preselecting the adjustment to be made to said pressure control means; and means for automatically terminating the operation of said adjusting means when the preselected adjustment of said pressure control means has been made.

25. In mechanism for controlling the pressure in an enclosure: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means, having one side subjected to control chamber pressure adapted to control the pressure in said control chamber; adjusting means for adjusting the response of said pressure control means so as to change said control pressure and thereby change cabin pressure; means for preselecting the adjustment to be made to said pressure control means; and means for automatically terminating the operation of said adjusting means when the preselected adjustment of said pressure control means has been made; and means for preselecting the rate of operation of said adjusting means, whereby to predetermine the time period for making the preselected adjustment.

26. Mechanism for controlling the pressure in an enclosure including: enclosure pressure control means operable to control the pressure in said enclosure, said pressure control means including a pressure sensitive element; a control chamber, said pressure sensitive element being exposed both to enclosure pressure and control chamber pressure in such a manner that changes in either of said pressures cause a movement of said pressure sensitive element whereby said enclosure pressure control means is operated to control said enclosure pressure; pressure control means for said control chamber, including pressure responsive means having one side subjected to control chamber pressure for controlling the pressure in said control chamber; actuating means for changing the response of said pressure control means; presettable control means for said actuating means for controlling the rate at which said actuating means operates; and preselecting means for stopping the operation of the actuating means after the latter has changed the response of said pressure control means to the preselected value.

27. Mechanism for controlling the pressure in an enclosure including: enclosure pressure control means operable to control the pressure in said enclosure, said pressure control means including a pressure sensitive element; a control chamber, said pressure sensitive element being exposed both to cabin pressure and control chamber pressure in such a manner that changes in either of said pressures cause a movement of said pressure sensitive element; pressure control means for said control chamber, including pressure responsive means having one side subjected to control chamber pressure for controlling the pressure in said control chamber; reversible actuating means for adjusting the response of said pressure control means; presettable control means for said actuating means adapted to control the rate at which said actuating means operates; and preselecting means associated with the actuating means for selecting the direction of change and effecting stopping of the actuating means after the latter has operated a predetermined amount.

28. In mechanism for controlling the pressure in an enclosure: walls defining a control pressure chamber; valve means adapted to control the flow through an opening of the enclosure; a movable pressure sensitive control element operatively associated with said valve means and adapted to be subjected on one side to enclosure pressure and on the other side to control chamber pressure; pressure control means for said control chamber including pressure responsive means having one side subjected to control chamber pressure for controlling the pressure in said control chamber; adjusting means for adjusting the response of said pressure control means to change said control chamber pressure; operating means for said adjusting means including preselecting means adapted to preselect an adjusted response for said pressure control means, and also including means adapted to arrest the operation of said adjusting means when the preselected adjustment has been reached.

29. In mechanism for controlling the pressure in an enclosure: walls defining a control pressure chamber; valve means adapted to control the flow through an opening of the enclosure; a movable pressure sensitive control element operatively associated with said valve means and adapted to be subjected on one side to enclosure pressure and on the other side to control chamber pressure; pressure control means for said control chamber including pressure responsive means having one side subjected to control chamber pressure for controlling the pressure in said control chamber; adjusting means for adjusting the response of said pressure control means to change said control chamber pressure; operating means for said adjusting means including preselecting means adapted to preselect an adjusted response for said pressure control means, and also including means adapted to arrest the operation of said adjusting means when the preselected adjustment has been reached; and rate control means for controlling the rate at which said adjustment is made.

30. In mechanism for controlling the pressure in an enclosure: walls defining a control pressure chamber; valve means adapted to control the flow through an opening of the enclosure; a movable pressure sensitive control element operatively associated with said valve means and adapted to be subjected on one side to enclosure pressure and on the other side to control chamber pressure; pressure control means for said control chamber including pressure responsive means having one side subjected to control chamber pressure for controlling the pressure in said control chamber; adjusting means for adjusting the response of said pressure control means to change said control chamber pressure; operating means for said adjusting means including preselecting means adapted to preselect the direction and the amount of adjustment to be made to said pressure control means, and also including means adapted to arrest the operation of said adjusting means when the preselected adjustment has been reached.

31. In mechanism for controlling the pressure in an enclosure: walls defining a control pressure chamber; valve means adapted to control the flow through an opening of the enclosure; a movable pressure sensitive control element operatively associated with said valve means and adapted to be subjected on one side to enclosure pressure and on the other side to control chamber pressure; pressure control means for said control chamber including pressure responsive means having one side subjected to control chamber pressure for controlling the pressure in said control chamber; adjusting means for adjusting the response of said pressure control means to change said control chamber pressure, said adjusting means including motor means operable in either direction; operating means for operating said motor means in either direction including preselecting means adapted to preselect the direction and the amount of adjustment to be made to said pressure control means, and also including means adapted to arrest the operation of said adjusting means when the preselected adjustment has been reached.

32. A method of controlling the position of a valve means having a movable wall, for controlling the pressure in an enclosure by controlling the outflow therefrom comprising the steps of: subjecting one side of the movable wall to the pressure in the enclosure and the other side of the movable wall to a control pressure so that said movable wall is caused to move upon a change in either of said pressures and thereby change the position of the valve means; maintaining substantially constant said control pressure so that fluctuations in enclosure pressure act against the movable wall to move the movable wall and valve means to thereby maintain a substantially constant pressure in the enclosure; and thereafter changing at a preselected rate said control pressure to a different constant pressure level to change the pressure level in said enclosure.

33. A method of controlling the position of a valve means having a movable wall, for controlling the pressure in an enclosure by controlling the outflow therefrom comprising the steps of: subjecting one side of the movable wall to the pressure in the enclosure and the other side of the movable wall to a control pressure so that said movable wall is caused to move upon a change in either of said pressures and thereby change the position of the valve means; maintaining a preselected substantially uniform control pressure to maintain enclosure pressure at a preselected pressure level; thereafter changing control pressure to a different substantially uniform pressure level to obtain a different pressure level in said enclosure; and maintaining said control pressure at its second substantially uniform pressure level so that enclosure pressure fluctuations act against the movable wall to move the valve means to maintain enclosure at its new pressure level.

JAMES M. KEMPER.

REFERENCES CITED

The following references are of record in the file of this patent:

UNITED STATES PATENTS

| Number | Name | Date |
| --- | --- | --- |
| 2,307,199 | Cooper | Jan. 5, 1943 |
| 2,391,197 | Schwein | Dec. 18, 1945 |
| 2,393,343 | Schroeder | Jan. 22, 1946 |
| 2,396,116 | Noxon | Mar. 5, 1946 |
| 2,399,326 | Crot | Apr. 30, 1946 |
| 2,402,681 | Schroeder | June 25, 1946 |
| 2,419,707 | Cooper et al. | Apr. 29, 1947 |
| 2,424,491 | Morris | July 22, 1947 |

FOREIGN PATENTS

| Number | Country | Date |
| --- | --- | --- |
| 521,623 | Great Britain | May 27, 1940 |
| 563,553 | Great Gritain | Aug. 21, 1944 |